Dec. 25, 1956   H. O. SCHJOLIN ET AL   2,775,330
TRANSMISSION AND CONTROL SYSTEM
Filed Nov. 21, 1952   4 Sheets-Sheet 1

INVENTORS
Hans O. Schjolin,
Helmuth Guentsche &
Willis V. Parshall
BY
Willis, Helwig & Baillio
ATTORNEYS

United States Patent Office 2,775,330
Patented Dec. 25, 1956

2,775,330

TRANSMISSION AND CONTROL SYSTEM

Hans O. Schjolin, Birmingham, and Helmuth Guentsche and Millis Vincent Parshall, Pontiac, Mich., assignors to General Motors Corporation, Detroit, Mich., a corporation of Delaware Application November 21, 1952, Serial No. 321,764

16 Claims. (Cl. 192—87)

This invention relates to transmissions and more particularly to a plural speed transmission and control system for use in conjunction with a manually shiftable plural speed transmission. The transmission and control system of this disclosure is particularly adapted for heavy duty service as experienced in the operation of trucks and busses.

By this invention there is provided a double acting clutch and planetary gearing unit of compact structure arranged to provide for neutral and a plurality of forward drive ratios as selected by a hydraulic control system. While the transmission gearing arrangement selected is illustrated as providing for direct drive or overdrive operation, it will be understood that the gearing may be modified to provide for other drive ratios such as direct drive or underdrive, if desired.

In the embodiment of the invention illustrated, means comprising a manually actuated switch may be utilized to enable the vehicle operator to select one or the other of two drive ratios irrespective of vehicle speed.

Another feature of this invention is the provision of a manually operable cam effective to select neutral or no-drive condition of transmission operation. The cam is preferably operated by means of a foot actuated lever corresponding to the normal vehicle clutch pedal.

An additional feature of this invention is the provision of a clutch actuating servo and control valve therefor, together with means intermediate the servo and valve whereby a definite relationship between the position of the clutch servo piston and the position of the valve is maintained.

A further feature of this invention lies in the provision of a clutch servo control valve having a plurality of control port carrying sleeves positioned within a casing and movable with respect to each other. The valve may be easily and quickly adjusted to establish a balanced condition of the valve in its neutral position.

Another feature of this invention is the provision of a spring mechanism operable in one position for establishing one drive ratio and functioning as a lever responsive to a control servo for establishing either neutral or a different drive ratio.

Still another feature of this invention is the provision of an auxiliary pump selectively operable by the vehicle operator for supplying pressure fluid to the control system.

These and other features, object and advantages of this invention will be apparent from the following specification and claims taken in conjunction with the accompanying drawings in which:

Figure 2a is an enlarged view of the valve 80 of Figure 2 to more clearly illustrate the various elements of the valve.

Figure 1:
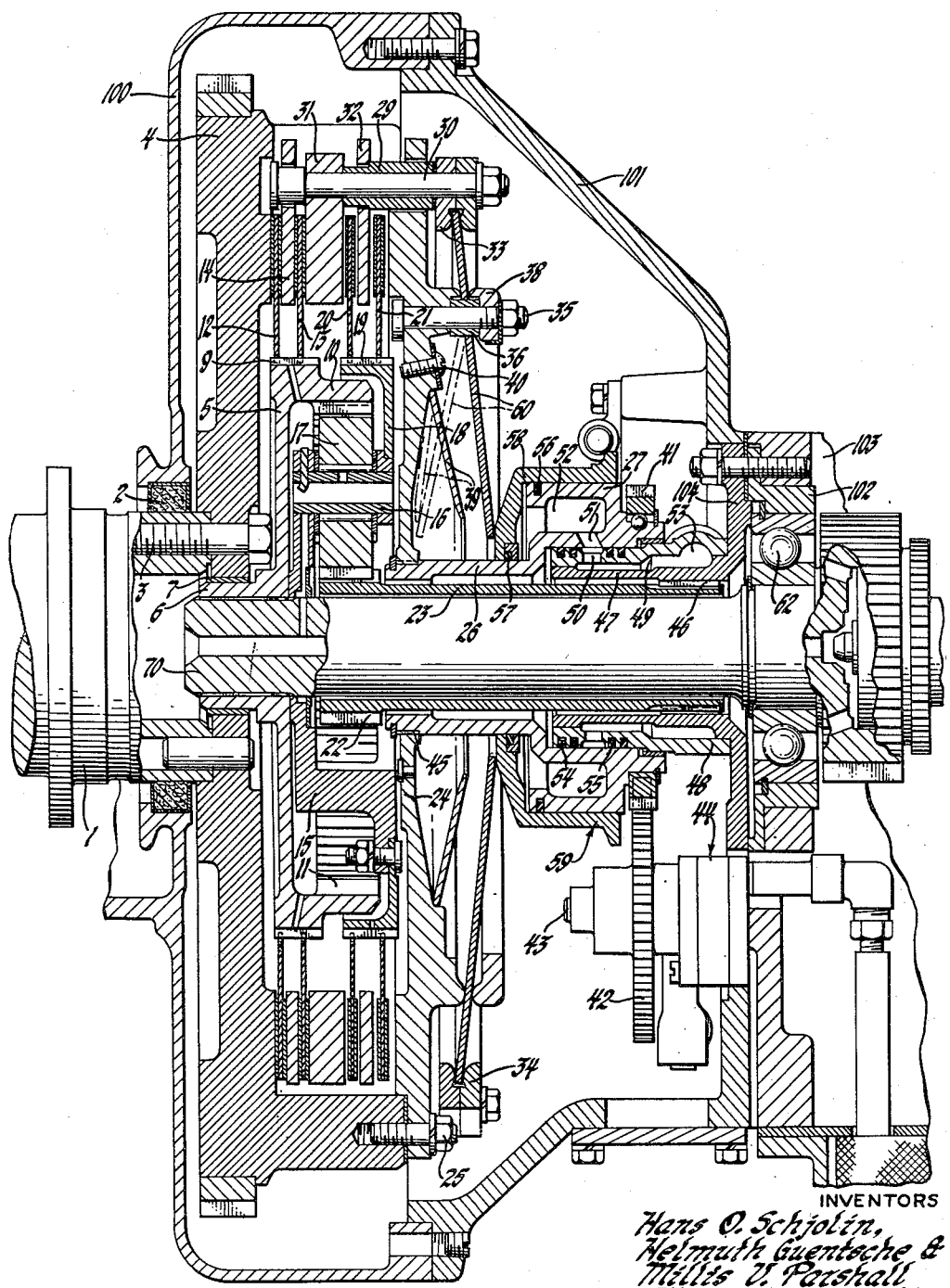
Figure 1 is a partially sectional view of the plural speed transmission unit.

Referring to Figure 1, there is shown a double acting clutch and planetary gearing unit adapted to be positioned in a vehicle drive train between the vehicle engine (not shown) and an additional transmission unit (not shown) which may be a manually shiftable gearing unit of the customary slide gear type. The planetary transmission and clutch arrangement is designed to provide for neutral or no-drive or a plurality of forward drive ratios. Preferably such drive ratios are exemplified as constituting direct drive and overdrive. In overdrive the engine speed is less than that of the power output shaft of the planetary transmission. Selection of neutral or any given drive ratio is obtained manually by means of a hydraulic control system hereafter more fully described.

The transmission unit of Figure 1 includes a transmission housing 100 bolted to a housing section 101 which is in turn bolted to a housing 102 and a housing 103 which may enclose a plural speed manually shiftable slide gear transmission of conventional construction, not shown. An engine driven shaft 1 is rotatably supported in housing section 100, there being an oil seal 2 disposed between shaft 1 and housing 100. Fixed to shaft 1 by any suitable number of bolts 3 is a clutch drum 4. A clutch hub 5 is splined to a power output shaft 70, the clutch hub having an axially extending flange 6 for supporting the hub upon shaft 70. Intermediate the flange 6 and drum 4 is a sleeve bearing 7. Thus, one end of power input shaft 1 and clutch drum 4 are supported upon shaft 70 through bearing 7 and flange 6 of clutch hub 5. Clutch hub 5 is shaped to include outwardly facing splines 9 and an axially extending portion 10 on which is formed an output ring gear 11 of a planetary gearing unit. A pair of clutch plates 12 and 13 carried by splines 9 extend radially outwardly, there being a floating spacer member 14 positioned intermediate clutch plates 12 and 13. Friction surfaces of any suitable type may be carried by clutch plates 12 and 13.

A planet carrier 15 is rotatably mounted upon the power output shaft 70, the carrier supporting a stub shaft 16 on which is supported a planet gear 17 rotatably mounted on stub shaft 16. An extension 18 of carrier 15 extends outwardly and laterally to overlie the portion 10 of clutch hub 5 and carries splines 19 adapted to receive a pair of clutch plates 20 and 21. A reaction sun gear 22 carried by a sleeve 23 is fixed against rotation, the sleeve 23 being splined to a housing 104. While only a single planet gear is illustrated, it will be understood that a plurality, preferably three, of such gears are included in the planetary gearing arrangement.

A radially extending cover 24 is bolted to clutch drum 4 by means of any suitable number of bolts 25. The base of cover 24 is supported upon a sleeve 26 extending axially from a servo housing 27. Housing 24 is drilled to carry a bushing 29 through which a bolt 30 protrudes. As is customary, any suitable number of bushings 29 and bolts 30 will ordinarily be spaced about the periphery of the clutch drum, only one being shown to simplify illustration. Bolt 30 carries a clutch actuator in the form of a presser plate 31 extending intermediate clutch plates 13 and 20. Bushing 29 carries a floating spacer or pressure plate 32 extending intermediate clutch plates 20 and 21. A floating spacer or presser plate 14 extending intermediate clutch plates 12 and 13 is carried by bolt 30. A boss or rim 33 adjacent the end of bushing 29 is carried by bolt 30, boss 33 being formed with a grooved portion 34 adapted to receive the rim of a Belleville spring member 60 which, as known in the art, and shown for example in Schjolin Patent 2,380,677 is a conical disk spring composed of circular rim having inwardly projecting radial fingers disposed in the surface of a cone which is quite flat or almost a disk. The spring is inherently stable with the cone on either side of the rim and the disk can be sprung through its center from one form or position to another, in either of which positions it will be held by its inherent elasticity. However, it cannot remain centered, that is in the plane of the rim, unless positively held by some external means. As is customary in the art, the Belleville spring 60 is used in one position or formation as a lever to set one clutch, and in another position or formation as a spring to set the other clutch. To this end the spring 60 has openings receiving bushings 36, there being an end cap 38 for retaining each bushing 36 and Belleville spring 60 in assembled relationship on bolts 35. Also supported upon housing 24 is a restoring or helper spring 39, a spring 39 being fastened to housing 24 by bolt 40. The function of spring 39 will hereafter be more fully described. Belleville spring 60 extends from boss 33 of bolt 30 to contact a fluid pressure servo piston 58 carried upon housing 27 and movable axially with respect thereto. A pump drive gear 41 carried by housing 27 meshes with a gear 42 fixed to a shaft 43 of a gear pump 44. Sleeve 26 of housing 27 is splined to housing 24 at 45 so that the pump is driven through clutch drum 4, housing 24, sleeve 26 and gears 41 and 42 whenever the vehicle engine is in operation. Sleeve 23 on which sun gear 22 is mounted is splined at 46 to a sleeve 47 formed as a part of or fixed to housing 104. A sleeve 48 extends around sleeve 47 and is spaced from sleeve 47 to form a passage 49. Sleeve 48 and servo housing 27 are drilled at 50 and 51 to admit fluid pressure to a servo chamber 52. Fluid pressure may be admitted to passage 49 by means of a gland 53. Oil seals 54 and 55 are carried by sleeve 48 to prevent oil leakage. An oil seal 56 carried by housing 27 and a seal 57 carried by piston 58 prevent leakage of oil from within servo chamber 52.

In the operation of the device, spring member 60 reacts upon piston 58 and through its spring action pivots about bushing 36 to apply presser plate 31 and plate 14 to clutch plates 13 and 12, respectively, to establish direct drive through the planetary gearing unit whenever fluid pressure is completely exhausted from servo chamber 52. Upon admission of fluid pressure to chamber 52, spring member 60 functions as a lever to move presser plate 31 and plate 32 against clutch plates 20 and 21, respectively, for overdrive operation. Due to the overcenter characteristic of operation of Belleville spring member 60, the mechanism would remain in overdrive operation upon release of fluid pressure from chamber 52. To obviate this difficulty, a helper spring 39 is contacted by member 60 when overdrive is established such that spring 39 is loaded during overdrive operation. Upon release of fluid pressure from chamber 52 of servo 59, spring 39, being stressed, pushes spring 60 through its center toward the right as Fig. 1 is viewed to overcome the snap-action effect of member 60. Thus, spring 39 biases member 60 to a condition wherein spring 60 through its own "oil can" or overcenter characteristic is effective to apply the direct drive clutches, provided oil pressure is released from chamber 52 of servo 59. For application of the direct drive clutch plates 12 and 13, member 60 acts as a spring to force the presser plates 14 and 31 against clutch plates 12 and 13, but in the application of clutch plates 20 and 21, member 60 acts as a lever to transfer force from piston 58 to bolt 30.

With the plural clutch plate arrangement shown in Figure 1, presser plate 31 is moved by bolt 30 to selectively engage clutches 13 and 20 in accordance with the action of member 60. Presser plate 14 is mounted upon bolts 30 as a floating member and is applied to clutch plate 12 upon movement of clutch plate 13 toward clutch drum 4, resulting from the spring effect of member 60. Presser plate 32 is also mounted as a floating member upon bolt 30, and is applied to clutch plate 21 when clutch plate 20 is moved toward housing member 24 through action of presser plate 31 upon admission of fluid pressure to chamber 52 of servo 59. In applying clutches 20 and 21, member 60 acts as a lever. It will be noted that the length of member 60 from bearing sleeve 36 to servo piston 58 is greater than that portion of member 60 between bearing sleeve 36 and member 33 on bolt 30; member 60, therefore, multiplies the force exerted upon bolt 30 as force is transferred from piston 58 to bolt 30.

In direct drive, torque is transferred from drum 4 to shaft 70 through clutch plates 12 and 13 and through clutch hub 5 splined to shaft 70. For overdrive operation, force is transferred from member 24 through clutch plates 20 and 21, carrier 18, planet gears 17, ring gear 11 and clutch hub 5. Sun gear 22 is fixed against rotation and acts as a reaction member so that planet carrier 15 is caused to rotate about the sun gear.

Shaft 70 at the power output side of the unit is supported in a roller bearing 62 carried by housing portion 102. Shaft 70 may be the power input shaft for a manually shiftable transmission unit, not shown.

The clutch and gearing arrangement of Figure 1 is also adapted to provide for neutral or no-drive condition, in which presser plate 31, plate 14, and plate 32 are each disposed out of driving engagement with the clutch plates by a control system hereafter described. The use of a plurality of clutch plates and presser plates for establishing direct or overdrive operation results in greater torque transfer capacity in a small space, longer clutch life, and smooth clutch engagement.

Figure 2:
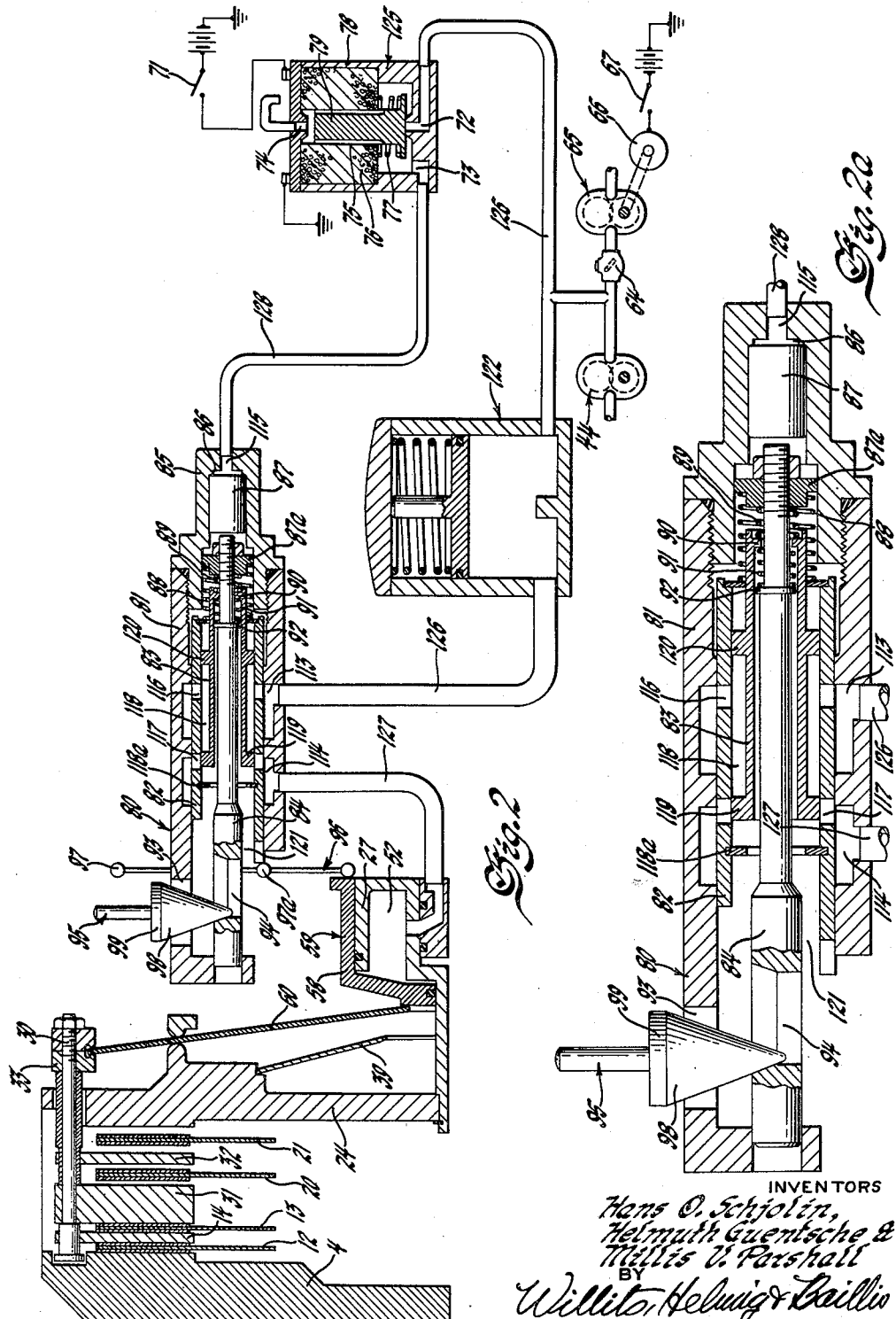
Figure 2 is a schematic diagram of the transmission control system illustrating the relationship of the control valves as conditioned to select direct drive operation.

In Figure 1, a single engine driven pump 44 is shown for supplying fluid pressure to the transmission control system. As shown in Figure 2, however, it is desirable to include in the control system an auxiliary pump 65 selectively operable by the vehicle operator.

Referring to Figure 2 the control system is illustrated as conditioned to select direct drive through the transmission. Parts similar to those of Figure 1 are given the same reference numerals as found in Figure 1. The control system for servo 59 includes a valve 80, a valve 125, an accumulator 122, and a pair of pumps 44 and 65. Pump 44 is engine driven. Pump 65 is an auxiliary pump which may be used to supply fluid pressure to the control system in the event that the vehicle engine should stall. Pumps 44 and 65 may be of any conventional type such as a gear pump. A check valve 64 is utilized to prevent fluid pressure from pump 44 being exhausted through pump 65 when pump 65 is not in operation. Pump 65 may be operated by hand if desired, but is preferably electrically driven by a motor 66 under control of a switch 67. Switch 67 may be positioned upon the vehicle instrument panel or in any readily available location such that the vehicle operator may energize motor 66 by closing the switch. Since pump 65 is for emergency use only, it may be operated from the vehicle battery as a source of energy. Pumps 44 and 65 supply fluid pressure to a pressure supply passage 126 leading to a port 72 of a solenoid valve 125 and to a pressure supply port 113 of the servo control valve 80. An accumulator 122 is placed in supply passage 126.

Servo control valve 80 is made up of a casing 81 having a pair of port carrying sleeves 82 and 83 and a stem member 84 disposed therein. An end cap 85 screwed into casing 81 is formed to provide a chamber 86 adapted to receive fluid pressure under the control of solenoid valve 125. A piston 87 in chamber 86 is operative upon stem 84 to position the valve sleeves for overdrive operation when fluid pressure is admitted to chamber 86. Stem 84 carries on one end thereof a cap 87a screwed upon stem 84 and adjustable upon stem 84 for presetting the relative position of port sleeves 82 and 83 with respect to each other. Sleeves 82 and 83 are movable with respect to each other and with respect to casing 81. A spring 88 is interposed between cap 87a and one end of sleeve 82. A relatively heavy spring 89 is interposed between cap 87a and one side of an inwardly extending flange 90 formed on sleeve 83. An additional relatively light spring 91 is interposed between flange 90 of sleeve 83 and a boss 92 on stem 84. Casing 81 and stem 84 are drilled at 93 and 94, respectively, to receive a cam 95 operated by the vehicle clutch pedal. A follow-up linkage composed of a rigid member 96 pivoted for rotation about fixed point 97 contacts sleeve 82 and servo piston 58 to establish a definite relationship between the position of port sleeve 82 and servo piston 58 at all times.

Cam 95, formed of a conical portion 98 and a cylindrical portion 99, serves to position stem 84, and sleeves 82 and 83 for neutral or no-drive operation whenever the clutch pedal is depressed and also serves as a reaction point limiting the permissible range of motion of stem 84 with respect to casing 81 whereby springs 88, 89 and 91 are able to bias the sleeves 82 and 83 for direct drive operation whenever pressure fluid is exhausted from chamber 86.

Figure 4:
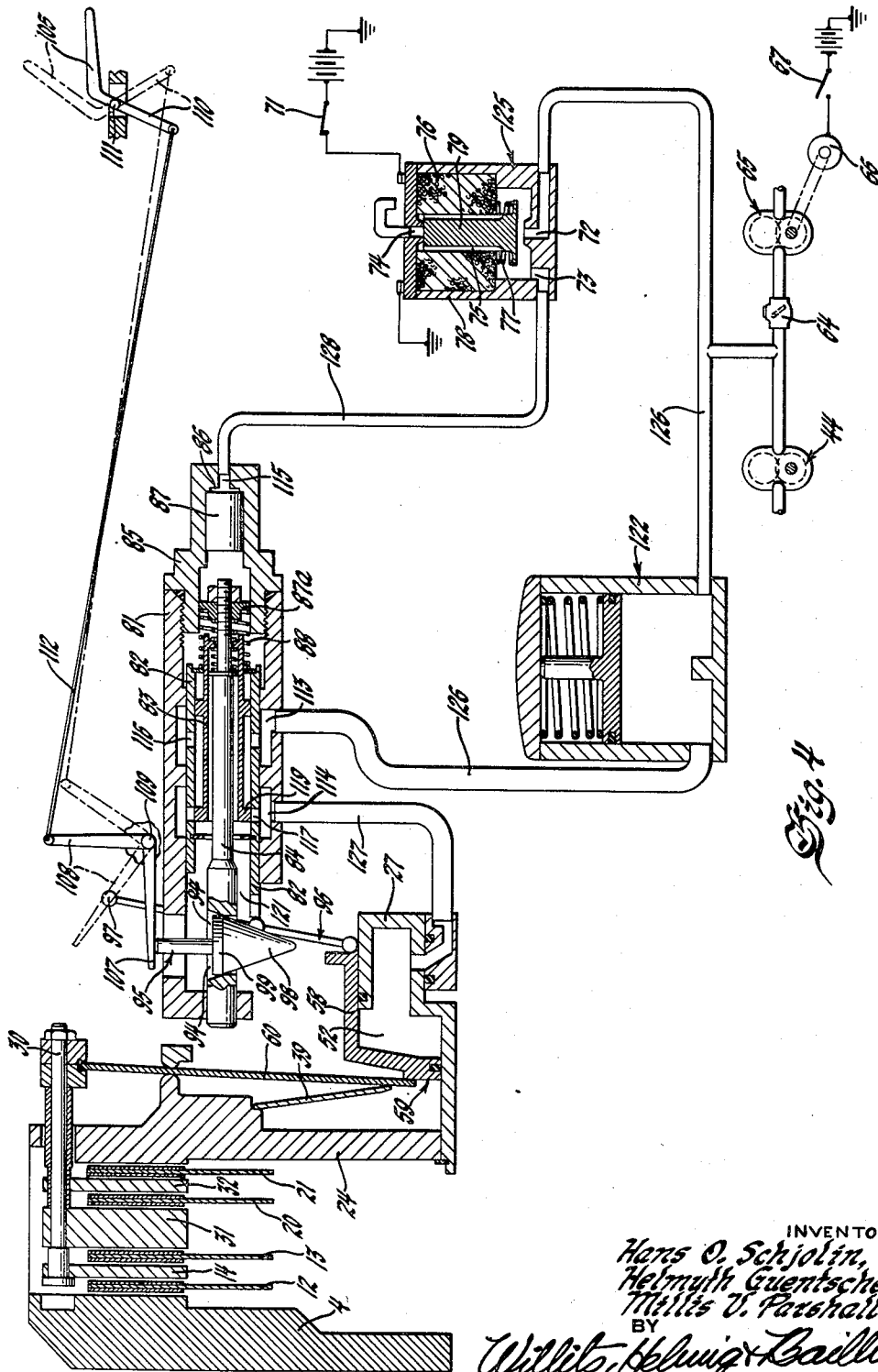
Figure 4 is a schematic diagram of the transmission control valves illustrating the relationship of the control valves after neutral or no-drive condition of transmission operation has been accomplished.

Cam 95 may be actuated from a clutch pedal 105, see Figure 4, by any suitable linkage such as a bell crank lever having arms 107 and 108 arranged to pivot about point 109 and an arm 110 fixed to pivot about point 111 and rigid with clutch pedal 105. Any suitable linkage such as rigid bar 112 may join arm 110 to arm 108. It will be noted that conical portion of cam 95 is never completely withdrawn from stem 84 but always protrudes through opening 94 of stem 84 to limit the range of movement of stem 84 with respect to casing 81.

Casing 81 is furnished with a pressure supply port 113, a pressure delivery port 114 and a control port 115. Sleeve 82 is furnished with ports 116 and 117 and carries a stop member 118a adapted to limit the range of motion of sleeve 83 with respect to sleeve 82 when fluid pressure is admitted to chamber 86. Sleeve 83 is furnished with an elongated port 118 located between spaced lands 119 and 120. An exhaust port 121 is provided in casing 81 whereby fluid pressure from chamber 52 of servo 59 may be exhausted to sump.

Solenoid valve 125 includes a casing 78 having a pressure supply port 72 connected to pump pressure supply passage 126, an exhaust port 74 through which pressure fluid may be exhausted to sump, and a pressure delivery port 73 connected to chamber 86 of valve 80 by way of passage 128. A valve member 79 within solenoid coil 76 is spring biased by a spring 77 to block off pressure supply port 72 and to connect port 73 to exhaust port 74 whenever the coil 76 is de-energized. A switch 71 may be positioned on the vehicle steering column or in any readily accessible position so that the vehicle operator may select overdrive by closing switch 71 or direct drive by opening switch 71. When coil 76 is energized, ports 72 and 73 are connected to admit pressure fluid to chamber 86 of valve 80 and exhaust port 74 is blocked off. The vehicle battery may be used as an electrical source for energizing solenoid coil 76.

In Figure 2, solenoid valve 125 is de-energized, switch 71 being open and fluid pressure from chamber 86 of valve 80 is exhausted by way of passage 128, port 73 and exhaust port 74. Pressure supply port 72 of valve 125 is blocked off by stem 79. To start the transmission unit in direct drive, clutch pedal 105 of Figure 4 is released so that cam 95 extends partially into opening 94 of stem 84. Follow-up lever 96 in pivoting about point 97, is held to the right by piston 58, holding sleeve 82 to the right so that springs 88 and 89 force valve stem 84 to the right as viewed in Figure 2. As the spring 89 expands, its effectiveness decreases until relatively small spring 91 is able to move sleeve 83 to crack port 117 and dump pressure from chamber 52 of servo 59 to exhaust through ports 117 and 121. Upon exhaust of pressure from chamber 52, helper spring 39 causes spring 60 to snap-over past its center position to apply the direct drive clutches.

Figure 3:
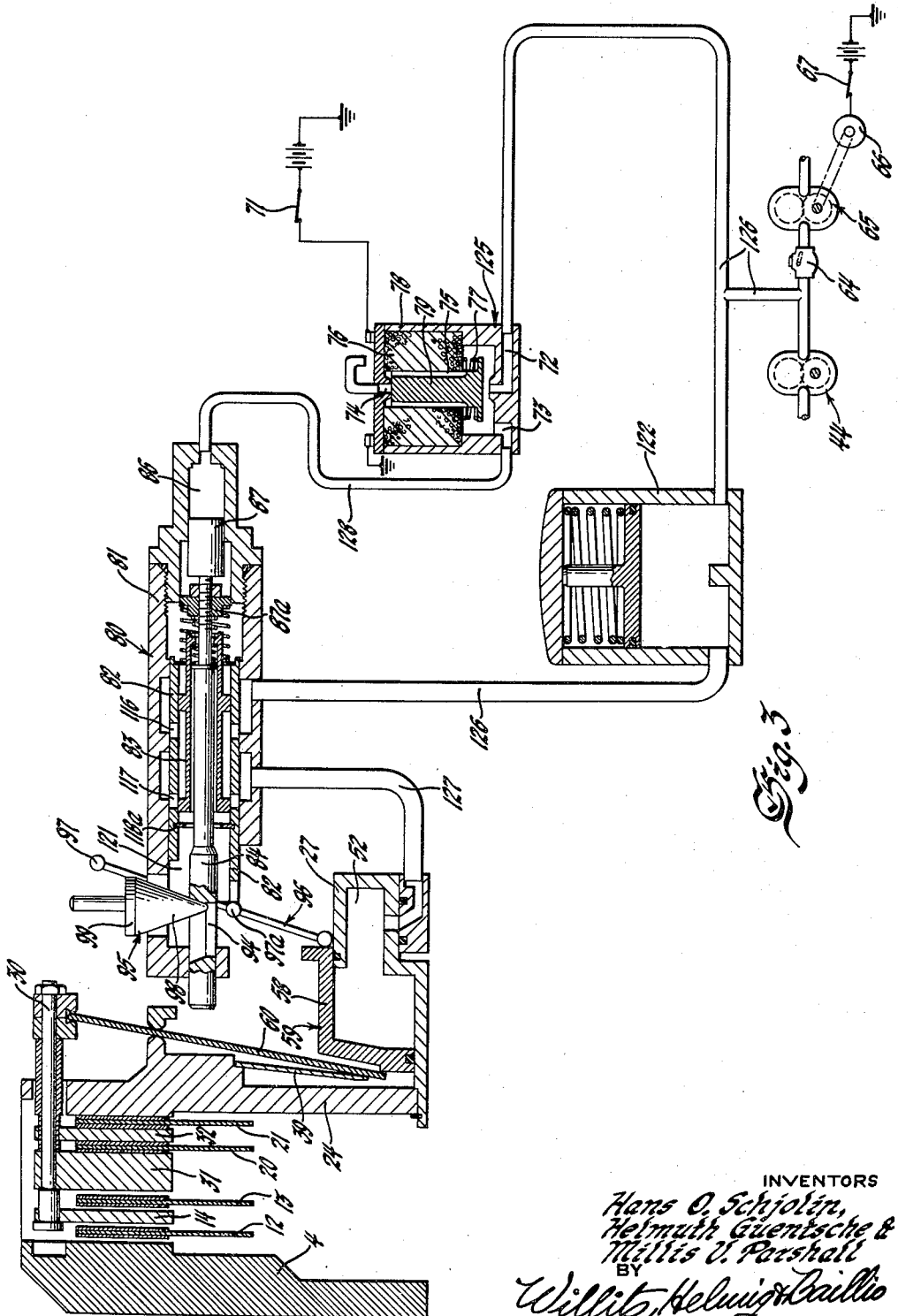
Figure 3 is a schematic diagram of the transmission control system illustrating the relationship of the control valves as conditioned to establish overdrive operation.

For overdrive operation, switch 71 is closed to energize solenoid 76. The position of the valves for overdrive operation is shown in Figure 3. When energized, solenoid valve 79 blocks off exhaust port 74 and admits line pressure from passage 126 to chamber 86 of valve 80 by way of ports 72 and 73 and passage 128. This pressure in chamber 86, acting upon piston 87, forces valve stem 84 toward cam 95 until the valve stem strikes conical portion 98 of cam 95.

As shown, sleeve 83 is moved to connect port 116 to port 117 to admit pump line pressure from passage 126 to servo chamber 52 by way of passage 127. Here again the port sleeve 82 bears against follow-up lever 96 and its range of movement is limited with respect to casing 81. A stop member 118a carried by sleeve 82 limits the permissible range of movement of sleeve 83 with respect to sleeve 82 under influence of pressure in chamber 86. Servo piston 58 is effective to force Belleville spring 60 against helper spring 39 such that force is transferred to bolt 30 to apply clutches 20 and 21 for overdrive operation.

For neutral or no-drive operation, clutch pedal 105 of Figure 4 is depressed to move cam 95 into opening 94 of stem 84 until the cylindrical portion 99 of the cam extends into opening 94 as shown in Figure 4. In the event that the transmission is being "shifted" from direct drive to neutral, stem 84 is moved by action of cam 95 such that pressure is supplied to chamber 52 through ports 116 and 117 and passage 127. This pressure, acting in chamber 52, forces piston 58 outwardly against the spring action of member 60 until pressure plates 14 and 31 are disengaged from clutch plates 12 and 13. With the cylindrical portion of cam 95 inserted in opening 94 of stem 84, the stem is unable to move with respect to casing 81. Piston 58 under the influence of fluid pressure in chamber 52 moves from its direct drive position toward its overdrive position. Continued movement of piston 58 toward its overdrive position is, however, arrested when neutral is reached due to the follow-up action of lever 96 on sleeve 82 of the control valve. When neutral condition of operation is achieved, lever 96 moving with piston 58 and rotating about point 97 moves valve sleeve 82 with respect to valve sleeve 83 until land 119 of sleeve 83 blocks off port 117 of sleeve 82 as shown in Figure 4. Fluid pressure is then trapped in chamber 52 to maintain the clutches disengaged.

In the event the transmission is being operated in overdrive when the clutch pedal is depressed, cam 95 moves stem 84 and piston 87 to the right, as viewed in Figure 4, against the pressure effect of line pressure in chamber 86. This action results in moving sleeve 83 to the right to exhaust pressure fluid from servo 59. When, however, neutral condition of transmission is accomplished, the follow-up action of lever 96 acting upon sleeve 82 moves sleeve 82 with respect to sleeve 83 until land 119 of sleeve 83 blocks off port 117. Fluid pressure is thereupon trapped in servo chamber 52 to maintain neutral condition of operation. Thus, lever 96 and sleeve 82 constitute a self-lapping mechanism whereby the valve sleeves are caused to block off exhaust port 121 and port 117 to trap fluid pressure in chamber 52 when neutral is obtained. There is always a definite predetermined relationship between the position of servo piston 58 and sleeve 82 of valve 80.

Cam 95 is preferably spring biased by means of a spring (not shown) to the position illustrated in Figures 2 and 3. The conical portion 98 of cam 95 is never completely withdrawn from stem 84. In direct drive position of stem 84, the conical portion of cam 95 limits the permissible range of motion of stem 84 toward the right, as viewed in the drawing Figure 1. In the overdrive position of Figure 1, the conical portion of cam 95 limits the permissible range of motion of stem 84 toward the left, as viewed in Figure 2. In neutral, the cylindrical portion of cam 95 centers the stem such that sleeves 82 and 83 cooperated to initially exhaust pressure from chamber 52 when shifting from overdrive to neutral, or initially admit fluid pressure to chamber 52 upon shifting to neutral from direct drive operation. The follow-up link 96 causes sleeve 82 to block off ports 117 and 121 to trap fluid in servo chamber 52 to maintain neutral or no-drive operation.

In the event that the vehicle engine should become stalled with the manual shift transmission (not shown) in gear and with the two speed transmission unit described herein in direct drive, it might be difficult to get the vehicle engine started due to the coupling from the engine to the rear wheels. In the absence of fluid pressure, neutral could not be obtained. Accordingly, the auxiliary pump 65 is furnished so that fluid pressure may be supplied to release the clutch. Since the auxiliary pump 65 is used for emergency conditions only, the pump is driven by power derived from the vehicle battery.

The preceding description recites the objects, advantages and useful results of this invention which incorporates a number of novel features in combination, which are subject to change in specific arrangement and form of structure without departing from the spirit and scope of the invention as defined in the following claims.

We claim:

1. In a clutch control system, a pair of selectively operable clutches, a clutch actuator, a fluid pressure responsive servo, a spring member operably connecting said clutch actuator to said servo effective to position said actuator to establish drive through one of said clutches upon admission of fluid pressure to said servo, said spring member being effective to bias said clutch actuator to establish drive through a second of said clutches upon exhaust of fluid pressure from said servo, a fluid pressure source, a valve for controlling said servo operable to selectively establish neutral and drive through either of said clutches, means yieldably biasing said valve to establish drive through said second clutch, a piston operatively associated with said valve, a second valve effective in one position to connect said piston to exhaust and effective in a second position to connect said piston to said fluid pressure source, said first-mentioned valve being movable responsive to fluid pressure admitted to said piston to establish drive through said first-mentioned clutch, and manually operable means for positioning said first-mentioned valve to select neutral operation irrespective of the position of said second-mentioned valve.

2. In a clutch control system of the class described, clutch means for establishing one drive relationship, clutch means for establishing another drive relationship, a clutch actuator, a fluid pressure responsive servo, spring means yieldably biasing said clutch actuator to establish drive through one of said clutch means upon exhaust of fluid pressure from said servo, said spring means being effective to disengage said clutch actuator from said one clutch means and to position said clutch actuator to establish drive through the other of said clutch means upon admission of fluid pressure to said servo, a fluid pressure source, a valve for controlling said servo, said valve including a casing, a pair of sleeves in said casing, ports in said sleeves, a stem movable with respect to said casing, springs intermediate said stem and each of said sleeves, respectively, a manually operable cam effective in one position to position said valve to establish neutral condition of operation, and a manually controlled valve effective in one position to direct fluid pressure from said source to said first-mentioned valve, said first-mentioned valve being responsive to fluid pressure controlled by said second-mentioned valve to direct fluid pressure to said servo to establish drive through said second-mentioned clutch means.

3. The combination set forth in claim 2 including a follow-up linkage intermediate the piston of said servo and one of said valve sleeves for moving said valve sleeves to trap fluid pressure in said servo upon movement of said cam to a position to establish neutral condition of operation.

4. In combination, a first clutch device including a first driven plate operable to establish one drive condition, a second clutch device including a second driven plate operable to establish a second drive condition, a presser plate mounted between said driven plates, a fluid operated servo having a movable member movable from a first position through a second position to a third position in response to supply of fluid under pressure to said servo, force transfer means including yielding means between the presser plate and servo movable member, said servo movable member exerting force through said force transfer means on said presser plate, said yielding means being effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a fluid pressure source, a valve hydraulically connected to said source for controlling the admission of fluid pressure from said source to said servo movable member, means yieldably biasing said valve to position said valve to connect said servo movable member to exhaust to enable said force transfer yielding means to position said servo movable member in said first position, fluid pressure responsive means associated with said valve and operable to position said valve to admit fluid pressure from said source to said servo movable member to position said servo movable member in said third position, an additional valve connected to said source for controlling the admission of fluid pressure to said fluid pressure responsive means, and manually operable means for positioning said first-mentioned valve to trap fluid pressure in said servo member when said servo movable member is in said second position irrespective of the position of said additional valve.

5. In combination, a first clutch device including a first driven plate operable to establish one drive condition, a second clutch device including a second driven plate operable to establish a second drive condition, a presser plate mounted between said driven plates, a fluid operated servo having a movable member movable from a first position through a second position to a third position in response to supply of fluid under pressure to said servo, force transfer means including yielding means between the presser plate and servo movable member, said servo movable member exerting force through said force transfer means on said presser plate, said yielding means being effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow-up valve comprising a housing, a first and a second valve element movable in said housing and movable relative to each other, means for causing said first valve member to occupy a first, second or third position according as said servo movable member is in its first, second or third position, manual means for moving said second valve element from a first or a third position to a second position intermediate said first and third positions, manual means for moving said second valve element from said first position to a third position, and a source of fluid under pressure, said valve elements being effective when said second valve element is in its first position to connect said servo to exhaust, said valve elements being effective when said second valve element is in its second position to connect said source of fluid under pressure to said servo as long as said first valve element is between its first and second positions, and to connect said servo to exhaust when said first valve element is between its second and third positions, said valve elements being effective when said second valve is in its third position to supply fluid under pressure to said servo to move said servo movable element to its third position.

6. In combination, a first clutch device including a first driven plate operable to establish one drive condition, a second clutch device including a second driven plate operable to establish a second drive condition, a presser plate mounted between said driven plates, force transfer means connected with said presser plate, a fluid operated servo having a movable member movable from a first position through a second position to a third position on the supply of fluid under pressure to said servo, said servo movable member exerting force through said force transfer means on said presser plate, yielding means effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow-up valve comprising a housing, a first and a second valve element movable in said housing and movable relative to each other, means for moving said first valve element to a first, second or third position according as said servo movable member is in its first, second or third position, a first manual means for moving said second element from a first, or a third position to a second position, intermediate said first and third positions, other manual means for moving said second valve element from its first position to its third position, and a source of fluid under pressure, said valve elements being effective when said second valve element is in its first position to connect said servo to exhaust, said valve elements being effective when said second valve element is in its second position to connect said servo to said source of fluid under pressure only if said first valve element is between its first and second positions and to connect said servo to exhaust if said first valve element is between its second and third positions, said valve elements being effective to connect said servo to said source when said second valve element is in its third position.

7. In combination, a first clutch device including a first driven plate operable to establish one drive condition, a second clutch device including a second driven plate operable to establish a second drive condition, a presser plate mounted between said driven plates, force transfer means connected with said presser plate, a fluid operated servo having a movable member movable from a first position through a second position to a third position on the supply of fluid under pressure to said servo, said servo movable member exerting force through said force transfer means on said presser plate, yielding means effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow-up valve comprising a housing, a first and a second valve element movable in said housing and movable relative to each other, means for moving said first valve element to a first, second or third position according as said servo movable member is in its first, second or third position, manual means for mechanically moving said second valve element from a first or a third position to a second position intermediate said first and third positions, manual means for hydraulically moving said second valve element from said first position to said third position, and a source of fluid under pressure, said valve elements being effective when said second valve element is in its first position to connect said servo to exhaust and when said second valve element is in its third position to connect said servo to said supply of fluid under pressure, said valve elements being effective when said second valve element is in its second position to connect said servo to said source of fluid under pressure when and only when said first valve element between its first or second position and being effective to connect said servo to exhaust when said second valve element is in its second position and said first valve element is between its second and third positions.

8. In combination a first clutch device including a first driven plate operable to establish one drive condition, a second clutch device including a second driven plate operable to establish a second drive condition, a presser plate mounted between said driven plates, force transfer means connected with said presser plate, a fluid operated servo having a movable member movable from a first position through a second position to a third position on the supply of fluid under pressure to said servo, said servo movable member exerting force through said force transfer means on said presser plate, yielding means effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow-up valve comprising a body, a sleeve slidable in said body, a valve element slidable in said sleeve, means for moving said sleeve to a first, second or third position according as said servo movable member occupies its first, second or third position, said valve element being movable to a first, second or third position, a source of fluid under pressure, manual means for moving said valve element from its first or third position to said second position and manual means for moving said valve element to said third position, means effective when said valve element is in its first position to connect said servo to exhaust, means effective when said valve element is in its third position to connect said servo to said source of fluid under pressure, means effective when said valve element is in its second position to connect said servo to said source of fluid under pressure if said sleeve is between its first and second positions and to connect said servo to exhaust if said sleeve is between its second and third positions.

9. In combination, a first clutch device including a first driven plate operable to establish one drive condition, a second clutch device including a second driven plate operable to establish a second drive condition, a presser plate mounted between said driven plates, force transfer means connected with said presser plate, a fluid operated servo having a movable member movable from a first position through a second position to a third position on the supply of fluid under pressure to said servo, said servo movable member exerting force through said force transfer means on said presser plate, yielding means effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow up valve comprising a housing, a first and a second valve element movable in said housing and movable relative to each other, each of said valve elements having a first, a second and a third position, the second position of each of said valve elements being located between the first and third positions thereof, means for moving said first valve element to its first, second or third position according as said servo movable element is in its first, second or third position, a source of fluid under pressure, first manually controlled means for moving said second valve element from its first to its third position, other manually controlled means for moving said second valve element from its first to its second position and for moving said second valve element from its third to its second position regardless of operation of said first manually controlled means, means effective when said second valve element is in said first position to connect said servo to exhaust and when said second valve element is in said third position to connect said servo to said source of fluid under pressure, and means effective when said second valve element is in said second position to connect said servo to exhaust if said first valve element is between its second and third positions and to connect said servo to said source of fluid under pressure if said first valve element is between its first and second positions.

10. In combination, a first clutch device including a first driven plate operable to establish one drive condition, a second clutch device including a second driven plate operable to establish a second drive condition, a presser plate mounted between said driven plates, force transfer means connected with said presser plate, a fluid operated servo having a movable member movable from a first position through a second position to a third position on the supply of fluid under pressure to said servo, said servo movable member exerting force through said force transfer means on said presser plate, yielding means effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow up valve comprising a body, a first valve element in the form of a sleeve movable in said body in a selected direction from a first through a second to a third position, a second valve element mounted in said sleeve and movable relative thereto in said selected direction from a first through a second to a third position, means for moving said first valve element to its first, second or third position according as said servo movable element is in its first, second or third position, manual means for moving said second valve element from its first or its third position to its second position, manual means for moving said second valve element from its first to its third position, means for limiting movement of second valve element relative to said first valve element in said selected direction, and a source of fluid under pressure, said valve elements cooperating to control the supply of fluid under pressure to and the release of fluid under pressure from said servo, said valve elements being effective to connect said servo to said source of fluid under pressure when said second valve element is in advance of said first valve element in said selected direction and being effective to connect said servo to exhaust when said second valve element is in arrears of said first valve element in said selected direction.

11. In combination, a first clutch device including a first driven plate operable to establish one drive condition, a second clutch device including a second driven plate operable to establish a second drive condition, a presser plate mounted between said driven plates, force transfer means connected with said presser plate, a fluid operated servo having a movable member movable from a first position through a second position to a third position on the supply of fluid under pressure to said servo, said servo movable member exerting force through said force transfer means on said presser plate, yielding means effective to cause said presser plate to grip said first driven plate when said servo movable member is in its first position, said force transfer means causing said presser plate to release both of said driven plates when said servo movable member is in its second position and causing said presser plate to grip said second driven plate when said servo movable member is in its third position, a follow-up valve comprising a body, a first valve element in the form of a sleeve movable in said body in a selected direction from a first through a second to a third position, a second valve element mounted in said sleeve and movable relative thereto in said selected direction from a first through a second to a third position, means for moving said first valve element to its first, second or third position according as said servo movable member is in its first, second or third position, means for limiting movement of said second valve element relative to said first valve element in said selected direction, means yieldingly urging said second valve element relative to said first valve element in the direction opposite said selected direction, an operating member, yielding means connecting said member to said second valve element, manually controlled means acting through said member to move said second valve element from its first or its third position to its second position, manually controlled means acting through said member to move said second valve element from its first to its third position, and a source of fluid under pressure, said first and second valve elements cooperating to control connection of said servo to said source of fluid under pressure or to exhaust, said valve elements being effective to connect said servo to said source of fluid under pressure when said second valve element is nearer its third position than said first valve element and being effective to connect said servo to exhaust when said second valve element is nearer its first position than said first valve element.

12. In a clutch control system for an engine driven vehicle, a pair of selectively operable clutches, a clutch actuator, a fluid pressure responsive servo, a spring member operably connecting said clutch actuator to said servo effective to position said actuator to establish drive through one of said clutches upon admission of fluid pressure to said servo, said spring member being effective to bias said clutch actuator to establish drive through a second of said clutches upon exhaust of fluid pressure from said servo, a fluid pressure source including an engine driven pump and an auxiliary pump, driver operable control means for rendering said auxiliary pump operative and inoperative, a valve for controlling said servo operable to selectively establish neutral and drive through either of said clutches, means yieldably biasing said valve to establish drive through said second clutch, a piston operatively associated with said valve, a second valve effective in one position to connect said piston to exhaust and effective in a second position to connect said piston to said fluid pressure source, driver operable means for controlling said second valve, said first-mentioned valve being movable responsive to fluid pressure admitted to said piston to establish drive through said first-mentioned clutch, and manually operable means for positioning said first-mentioned valve to select neutral operation irrespective of the position of said second-mentioned valve.

13. In a clutch control system for an engine driven vehicle, clutch means for establishing one drive relationship, clutch means for establishing another drive relationship, a clutch actuator, a fluid pressure responsive servo, spring means yieldably biasing said clutch actuator to establish drive through one of said clutch means upon exhaust of fluid pressure from said servo, said spring means being effective to disengage said clutch actuator to establish drive through the other of said clutch means upon admission of fluid pressure to said servo, a fluid pressure source including an engine driven pump and an auxiliary pump, driver operable control means for rendering said auxiliary pump operative when said engine driven pump is inoperative, a valve for controlling said servo, said valve including a casing, a pair of sleeves in said casing, ports in said sleeves, a stem movable with respect to said casing, springs intermediate said stem and each of said sleeves, respectively, driver operable means effective in one position to position said valve to establish neutral condition of operation, and a driver controlled valve effective in one position to direct fluid pressure from said source to said first-mentioned valve, said first-mentioned valve being responsive to fluid pressure controlled by said second-mentioned valve to direct fluid pressure from said source to said servo to establish drive through said second-mentioned clutch means.

14. The combination set forth in claim 13 including a follow-up linkage intermediate the piston of said servo and one of said valve sleeves for moving said valve sleeves to trap fluid pressure in said servo upon movement of said driver operable means to a position to establish neutral condition of operation.

15. In a clutch control system, a pair of selectively operable clutches, a clutch actuator, a fluid pressure responsive servo, a Belleville spring operably connecting said clutch actuator to said servo effective to position said actuator to engage one of said clutches upon admission of fluid pressure to said servo, said Belleville spring being effective to position such clutch actuator to engage a second of said clutches and release said first clutch upon exhaust of fluid pressure from said servo, a fluid pressure source, valve means for controlling said servo hydraulically connected to said fluid pressure source operable to selectively establish neutral and drive through either of said clutches, means yieldably biasing said valve means to engage said second clutch, fluid pressure responsive means operatively associated with said valve means, a second valve connected to said source effective in one position to connect said fluid pressure responsive means to exhaust and effective in a second position to connect said fluid pressure responsive means to said fluid pressure source, manually controlled means for controlling the position of said second valve, said first-mentioned valve means being movable in response to fluid pressure admitted to said fluid pressure responsive means to engage said first-mentioned clutch, and manually operable means for positioning said first-mentioned valve means to select neutral operation irrespective of the position of said second valve.

16. In a clutch control system for an engine driven vehicle, clutch means for establishing one drive relationship, clutch means for establishing another drive relationship, a clutch actuator, a fluid pressure responsive servo, spring means yieldably biasing said clutch actuator to engage one of said clutch means upon exhaust of fluid pressure from said servo, said spring means being effective to disengage said clutch actuator from said one clutch means and to position said clutch actuator to engage the other of said clutch means upon admission of fluid pressure to said servo, a fluid pressure source, valve means connected to said source for controlling said servo, said servo having a movable member operative upon said spring means, said valve including a casing, a pair of sleeves in said casing, ports in said sleeves, a stem extending through said sleeves and movable with respect to said casing, springs intermediate said stem and each of said sleeves, respectively, means carried by said stem and operative upon said springs for adjusting the position of said sleeves with respect to each other, a linkage intermediate said servo movable member and one of said sleeves for maintaining a predeterimned positional relationship between the position of said servo movable member and said one sleeve, manually operable means effective in one position to position said valve means to trap fluid pressure in said servo to establish neutral condition of operation, and an additional manually controlled valve connected to said source and effective in one position to direct fluid pressure from said source to said first-mentioned valve means, said first-mentioned valve means being responsive to fluid pressure controlled by said additional manually controlled valve to direct fluid pressure to said servo to establish drive through said second-mentioned clutch means.

References Cited in the file of this patent
UNITED STATES PATENTS

| | | |
|---|---|---|
| 530,994 | Howe | Dec. 18, 1894 |
| 588,946 | Bergman | Aug. 31, 1897 |
| 1,231,257 | Herr | June 26, 1917 |
| 1,628,603 | Ferris | May 10, 1927 |
| 1,835,686 | Allan et al. | Dec. 8, 1931 |
| 1,990,814 | Castro | Feb. 12, 1935 |
| 2,248,133 | Snow | July 8, 1941 |
| 2,373,226 | Coates | Apr. 10, 1945 |
| 2,485,688 | Banker | Oct. 25, 1949 |
| 2,603,327 | King | July 15, 1952 |
| 2,633,035 | Livermore | Mar. 31, 1953 |
| 2,636,585 | Livermore | Apr. 28, 1953 |
| 2,690,192 | Dannhardt | Sept. 28, 1954 |
| 2,700,544 | Ahlen | Jan. 25, 1955 |
| 2,705,940 | Edwards | Apr. 12, 1955 |